_United States Patent Office_

3,329,484
Patented July 4, 1967

3,329,484
TITANIUM DIOXIDE PIGMENT AND METHOD FOR PREPARATION THEREOF
Ray S. Long, Concord, and David A. Ellis, Martinez, Calif., Kenneth E. Cox, Albuquerque, N. Mex., and James E. Magner, Antioch, Calif., assignors to The Dow Chemical Company, Midland, Mich., a corporation of Delaware
No Drawing. Filed Sept. 15, 1966, Ser. No. 579,526
11 Claims. (Cl. 23—202)

ABSTRACT OF THE DISCLOSURE

This invention relates to the preparation of a pigment-grade titanium dioxide. More particularly the present invention is concerned with a novel monocrystalline titanium dioxide product having excellent tinting strength and whiteness and to a method for preparing this product from aqueous titanium tetrachloride solutions.

---

This application is a continuation-in-part of application Ser. No. 381,529, filed July 9, 1964, now abandoned, which in turn was a continuation-in-part of application Ser. No. 281,789, filed May 20, 1963, now abandoned.

It is a principal object of the present invention to provide a pigment grade $TiO_2$ product having excellent tinting strength and whiteness.

It is another object of the present invention to provide a pigment grade titanium dioxide from aqueous titanium tetrachloride solutions which product has excellent tinting strength and whitening properties superior to titanium dioxide pigments obtained heretofore from such titanium source materials.

It is also an object of the present invention to provide a novel, high tinting strength, monocrystalline, rutile titanium dioxide pigment having a uniform predetermined particle size and configuration.

It is a further object of the present invention to provide a high quality titanium dioxide pigment from low grade titanium source materials.

It is another object of the present invention to provide a process for preparing a superior titanium dioxide pigment wherein concentrated hydrochloric acid, which can be recycled or otherwise employed, also is economically recovered.

It is also an object of the present invention to provide a process for preparing a novel monocrystalline titanium dioxide product suitable for use as a pigment wherein the uncalcined product exhibits excellent tinting strength which in many cases is superior to calcined products produced by methods employed heretofore.

These and other objects and advantages will become apparent from the detailed description presented hereinafter.

The present novel titanium dioxide composition is a monocrystalline, rutile material of substantially uniform, needle-like elongated particles having a cross-section diameter of from about 0.05 to about 0.2 micron, preferably about 0.1 micron, and a length of from about 0.3 to about 1.5 microns, preferably about 0.8 micron. Further, this material has a length to cross-section diameter ratio of from about 3 to about 15, preferably from about 4 to about 10, and desirably about 8.

Because of its specific, unique crystalline habit and configuration, this novel titanium dioxide product exhibits excellent tinting strength and hiding power superior to that obtained with titanium dioxide pigments produced heretofore from titanium chloride sources.

The novel $TiO_2$ composition of the present invention is prepared as follows: A colloidal suspension of titanium dioxide in an aqueous medium, hereinafter referred to as "seed," and prepared from a solution having a low chloride/titanium ratio is added to an aqueous solution hereinafter referred to as "master solution," having a high chloride/titanium ratio and the resulting mixture hydrolyzed, preferably at an elevated temperature to precipitate a titanium oxide product. This product is separated from the reaction mixture. As produced, the hydrolyzed product from high temperature hydrolysis possesses an unexpectedly high tinting strength and can be used directly as a pigment. However, if desired, the product can be heated at a high temperature, e.g. about 850° C. to further upgrade the tinting strength and hiding power of a precipitated titanium oxide product.

In actual practice, the titanium oxide nucleating reactant, i.e. "seed," is prepared from an aqueous titanium chloride solution having a chloride/titanium gram-mole ratio of from about 1.5 to about 4, preferably from about 1.6 to about 2.3, a pH of from about 0.3 to about 0.7 and a titanium concentration (expressed as Ti) of from about 8 to about 30 grams per liter, preferably from about 8 to about 15 grams per liter. (The term "titanium" as used herein means titanium in an oxidized state and not the elemental, metallic state). The solution is heated at a temperature of from about 60 to about 90° C. for a period of from about 4 to about 60 minutes and preferably at a temperature of from about 75 to about 85° C. for about 15 to about 30 minutes whereupon a bluish-colored opalescent collodial suspension of titanium dioxide particles having a diameter of from about 0.002 to about 0.010 micron precipitates therein.

A quantity of the seed material sufficient to supply a titanium concentration of from about 4 to 10 weight percent and preferably from about 5 to about 7 percent by weight of the titanium values in the final reaction mixture is added to a master solution having a minimum chloride/titanium ratio, based on gram-mole equivalents, of 4 and preferably greater than 4, a hydrogen $(H^+)$/titanium ratio of at least 4 and a titanium concentration (expressed as Ti) of from about 15 to about 85 grams per liter and preferably from about 30 to about 45 grams per liter.

The resulting reaction mixture contains from about 10 to about 60 grams of titanium per liter, and preferably from about 20 to about 40 grams per liter. The chloride concentration can vary from about 6 to about 10 molar, depending on the hydrolysis temperature employed. The preferred chloride concentration is about 7 g. ions/l. at 150° C., about 8 g. ions/l. at 200° C. and about 9 g. ions/l. at 260° C.

The mixture is heated to hydrolyze the titanium chlorides present therein and precipitate the titanium values as titanium oxides having a rutile crystal structure.

Following precipitation of the titanium oxide product by the hydrolysis reaction, this material is separated from the reaction mixture, as by filtration or centrifugation, and washed.

Satisfactory hydrolysis of the titanium chloride results by heating the reactant mixture at about 100° and 1 atmosphere pressure, for example. However, unexpectedly it has been found if the hydrolysis reaction is carried out in sealed reactors at higher temperatures, i.e. at least about 130° C., usually above about 190° C., and preferably at from about 210 to about 260° C. and autognous pressures the resulting precipitated titanium oxide product without subsequent calcination exhibits an unusually high tinting strength. For example, hydrolyzing seed-titanium chloride master solution admixtures set forth hereinbefore in a pressurizable reactor at a temperature of from about 130° to about 150° C. and autogenous pressure for a period of from about 1 to about 5 hours produced monocrystalline titanium dioxide having a tinting strength of from about 900 to about 1350; at 175° C. and 3 to 6 hours at autogenous pressure a monocrystalline rutile product having a tinting strength of from about 1650 to about 1750 was realized while at about 190° C. and autogenous pressure hydrolysis for a period of about 2 to 5 hours gave a monocrystalline, rutile titanium dioxide product which exhibited tinting strengths in the range of from about 1850 to about 1900. With hydrolysis temperatures of from about 210° to about 260° C. and treatment times of from about 0.5 to about 5 hours, the precipitated monocrystalline rutile titanium oxide products had tinting strengths of from about 1950 to about 2150.

If desired, as set forth hereinbefore, the precipitated product resulting from the high temperature hydrolysis can be calcined at a temperature of about 700 to about 900° for a period of time of from about 0.5 to about 6 hours and preferably from about 800 to about 850° for about one hour to further increase the tinting strength although even in the uncalcined state is it to be understood these products are suitable for use as pigments.

The seed and titanium chloride solution used for preparing the present novel product can be made from a variety of source materials. To illustrate: $TiCl_4$ obtained by direct chlorination of titanium containing materials can be introduced into water and the pH of the solution adjusted by additions of base such as caustic (NaOH) or (KOH), or ammonia.

Conveniently, however, the substantially iron-free $TiCl_4$ leach liquor solution resulting from the dissolution of a titaniferous material by hydrochloric acid with subsequent solvent extraction for iron removal as set forth in application Ser. No. 158,484, filed Dec. 11, 1961 is employed. The acidic titanium chloride raffinate obtained in this process not only is an excellent high-purity titanium chloride master solution, but also unexpectedly provides a desirable source solution for seed preparation as well. To illustrate, heating the raffinate under reduced pressure, for example, to remove excess HCl provides the predetermined $Cl^-/Ti$ ratio required for seed preparation. The so-concentrated solution is diluted to the proper Ti concentration range with or without additional neutralization. Such solutions when used for seed production gave no undesirable or detrimental solids precipitation and provide an excellent, uniform colloidal suspension of seed nuclei.

The novel $TiO_2$ product produced from this raffinate solution using seed also prepared from this same material is of a good quality and tinting strength. However, if desired, to assure even a higher degree of "whiteness" and brightness in the final calcined product the leach liquor can be filtered before use to remove any fines from ore residue, for example, which may remain therein.

Additionally, this leach liquor can be washed with a volatile solvent, such as pentane for example, prior to use in the present process. By following such manipulative procedures along with thoroughly washing the precipitated product and using seed prepared from the acidic titanium containing raffinate described directly hereinbefore consistently provides white titanium dioxide pigment having tinting strengths of 1700 and higher.

As produced, the novel product is directly applicable for use as a pigment in water based (latex) paints. For use in oil base paints, baked enamels and for the pigmenting of plastics, for example, the present $TiO_2$ product can be coated with alumina and/or silica as is commonly practiced in the art.

Although a substantially iron-free solution is preferred for preparing the present $TiO_2$ product, a satisfactory pigment can result even though some iron is present in the reactant materials.

The following examples will serve to further illustrate the present invention, but are not meant to limit it thereto.

*Example 1*

An Ione ilmenite ore (Fe=12.1 percent and Ti=23.4 percent) was ground until 95 percent passed through a 200 mesh U.S. Standard sieve. The ore was treated with about 9 moles of hydrochloric acid per stoichiometric equivalent of acid soluble metal values therein under controlled conditions whereby a maximum temperature of about 80° C. was not exceeded. The initial acid/slurry was agitated for about 3 hours after which time only a small amount of insoluble residue remained. This residue was separated from the aqueous solution and the acidic solution was mixed with a solution of 50 volume percent tributyl phosphate in toluene (1.9 molar) and the mixture then agitated for about 10 minutes. After this time, the organic and aqueous acid layers were allowed to separate and the organic upper layer containing substantially all of the iron was decanted from the two phase system. The resulting aqueous acidic phase contained about 45 grams titanium per liter and less than about 0.01 gram per liter of iron.

A portion of the acidic titanium chloride raffinate solution was evaporated with HCl removal to give a concentration of about 270 grams per liter titanium, being about 9.4 molar in chloride and about 3½ molar in hydrogen. The resulting solution had a Cl/Ti mole ratio of about 1.7 and a pH of about 0.5. The solution was diluted to provide a seed solution containing about 15 grams titanium per liter. About 100 ml. of the seed solution was simmered at about 85° C. for about 7 minutes. During this time about 83 percent of the titanium precipitated as substantially uniform nuclei of titanium oxides having diameters of from about 0.002 to about 0.010 micron. The resulting colloidal suspension was blue in color, turbid and exhibited an opalescence. About 20 cubic centimeters of the precipitated seed product was added to 100 milliliters of an extracted substantially iron-free leach liquor containing about 44 grams titanium per liter and being about 8.2 molar in chloride. The resulting reaction mixture was heated to about 100° C. at atmospheric pressure to hydrolyze the titanium chloride and precipitate titanium oxide product. The resulting precipitate was separated from the reaction mixture, washed and calcined in a covered crucible for 1 hour at about 850° C.

The calcined product was found to consist of substantially uniform needle-like monocrystalline particles having a cross-sectional diameter of about 0.1 to 0.2 micron and a length of from about 0.4 to about 0.8 micron. Further the length to cross-sectional diameter ratio of the particles was about 4.

The calcined product was examined for tinting strength using a modified Reynolds method of tinting strength comparison. This method gives to a given material a number which is its whitening power, i.e. the measure of the ability of the product to whiten a standard amount of blue color, relative to a standard pigment. In the conventional Reynolds test, the standard is Titonox B pigment with a tinting strength of 390. In the present test, Du Pont R510 pigment having a tinting strength of 1600 was used as the standard. The titanium dioxide product of the present example exhibited a tinting strength of about 1800.

The product preparation was repeated two more times using the same materials and procedures except that the simmer time for seed preparation was 10 and 14 minutes respectively for each of the latter two runs. The resulting monocrystalline needle-like product was observed under the electron microscope had substantially the same size and shape as set forth hereinbefore. The tinting strengths of the calcined products were found to be about 1850 and 1900 respectively.

*Example 2*

A sample of a titanium leach liquor obtained from hydrochloric acidulation and solvent extraction of a titaniferous source material prepared according to the general procedure described in Example 1 was evaporated by HCl removal to provide a Cl−/Ti ratio of 1.9 and was found to contain about 234 grams per liter titanium and be about 9.14 molar in chloride. Calcium hydroxide was added to give a theoretical H+/Ti ratio of 0.94 and the titanium concentration was adjusted to 25 grams Ti/l. This solution was heated for about 10 minutes at 85° C. and produced a bluish colored, opalescent, colloidal suspension without massive precipitation. The resulting aqueous seed suspension exhibited a pH of about 0.3. This seed was added to an acidic substantially iron-free raffinate solution (master solution) containing about 44 grams titanium per liter and being 8.2 molar in chloride. The amount of seed to raffinate was such that the seed provided about 7 percent of the total TiO₂ in the resulting reaction mixture. Hydrolysis, separation of the precipitated TiO₂ product, washing and calcination as described in accordance with the procedure set forth in Example 1 gave a monocrystalline titanium dioxide pigment of substantially the same size and particle shape as set forth for the product of Example 1.

*Example 3*

About 3.4 milliliters of a seed containing 15 grams titanium per liter, made by diluting a low pressure evacuated iron-free leach liquor in a manner similar to that described for the preceding example, was added to 25 milliliters of an iron-free leach liquor in a glass ampule. The ampule was sealed and placed in a bomb. This bomb was heated to 190° C. and maintained at this temperature for about 3 hours while being continuously rocked back and forth. Following this period, the precipitated product was filtered, washed and calcined at about 850° for one hour. Electron microscope investigation indicated the resulting monocrystalline, rutile titanium dioxide needle-like product was substantially the same as the product described in the preceding example for the atmospheric-pressure hydrolysis except that the particle length to cross-section diameter ratio was about 6. This novel pigment material exhibited a tinting strength of about 2100.

*Example 4*

A seed product containing about 15 grams titanium per liter and a leach solution containing about 38 grams titanium per liter were prepared in accordance with the general procedures described in Example 1. The colloidal suspension of seed product was mixed with the leach liquor to provide an amount of seed corresponding to from about 6 to about 7 percent by weight of the titanium in the leach liquor.

A number of hydrolysis runs were made using fresh portions of the feed stock material for each run. The studies were conducted at various temperatures for predetermined periods of time using a sealed reactor. The resulting products of the hydrolysis reactions carried out at above 190° C. predominantly were monocrystalline rod-like particles about 0.1 micron in diameter and ranging from about 0.3 to about 1.5 microns in length. In each hydrolysis product the rod-like particles as produced had an average length/diameter ratio of from about 5 to about 7.

The tinting strengths of the hydrolyzed titanium oxide products as precipitated and oven dried (110° C.) and following calcination at about 850° C. for about 1 hour were determined using the modified Reynolds method of tinting strength comparison.

The results of these studies are summarized in Table I which follows:

TABLE I

| Run No. | Hydrolysis Conditions | | Tinting Strength of Hydrolyzed Product | |
|---|---|---|---|---|
| | Temperature (° C.) | Time (hours) | Oven Dried 110° C. | Calcined 850° C. |
| 1 | (¹) | 0.5 | 700 | 1,850 |
| 2 | (¹) | 1 | 850 | 1,800 |
| 3 | (¹) | 5 | 700 | 2,000 |
| 4 | 130 | 1 | 950 | 1,950 |
| 5 | 130 | 3 | 900 | 1,950 |
| 6 | 130 | 6 | 1,050 | 2,050 |
| 7 | 150 | 3 | 1,000 | 1,950 |
| 8 | 150 | 5 | 1,350 | 2,200 |
| 9 | 175 | 1 | 1,200 | 2,050 |
| 10 | 175 | 3 | 1,650 | 2,150 |
| 11 | 175 | 6 | 1,750 | 2,250 |
| 12 | 190 | 3 | 1,900 | 2,250 |
| 13 | 210 | 2 | 1,950 | 2,150 |
| 14 | 210 | 3 | 1,950 | 2,250 |
| 15 | 230 | 3 | 1,950 | 2,050 |
| 16 | 250 | 0.5 | 2,150 | 2,250 |
| 17 | 250 | 3 | 2,050 | 1,950 |
| 18 | 260 | 0.5 | 2,050 | 2,150 |

¹ Atmospheric boil.

These studies clearly show the unexpectedly high useful tinting strengths of hydrolyzed, uncalcined products of those materials hydrolyzed at temperatures of at least about 190° C. X-ray diffraction analysis of the product produced at this higher temperature hydrolysis indicated this to be substantially completely rutile.

In a manner similar to that described for the foregoing examples, an aqueous titanium chloride solution prepared by quenching a titanium tetrachloride electrolysis product material can be utilized as a seed source and as a master solution for preparing the present novel, acicular TiO₂ pigment grade product.

Various modifications can be made in the present invention without departing from the spirit or scope thereof for it is understood that we limit ourselves only as defined in the appended claims.

We claim:

1. A pigment grade, monocrystalline, acicular, rutile titanium dioxide having a cross-sectional diameter of from about 0.05 to about 0.2 micron, a length of from about 0.3 to about 1.5 microns and further characterized in that the ratio of length to cross sectional diameter is from about 3 to about 15 said titanium dioxide having a tinting strength of at least about 900.

2. The monocrystalline, acicular, rutile titanium dioxide as defined in claim 1 having a ratio of length to cross-sectional diameter of from about 4 to about 10 and a tinting strength of at least about 1700.

3. A process for preparing a pigment grade, acicular, rutile titanium dioxide product which comprises;
 (a) admixing an aqueous turbid, bluish-colored, opalescent colloidal suspension of titanium dioxide nucleating seed particles with an acidic titanium chloride solution having a minimum chloride/titanium ratio of 4, a minimum hydrogen ion/titanium ratio of 4, and a titanium concentration of from about 15 to about 85 grams per liter, the titanium dioxide nucleating seed particles in said suspension having diameters ranging from about 0.002 to about 0.01 micron, said colloidal suspension providing from about 4 to about 10 weight percent of the titanium values in the resulting admixture and said colloidal suspension being prepared by heating an aqueous titanium chloride solution having a chloride/titanium ratio of from about 1.5 to about 4, a pH of from about 0.3 to about 0.7 and a titanium concentration of from about 8 to about 30 grams per liter,
 (b) heating said admixture at a minimum temperature of about 190° C. under autogenous pressure to hydrolyze the titanium chloride present therein and precipitate the titanium values therein as a pigment grade, acicular, rutile titanium dioxide product having a cross-sectional diameter of from about 0.05 to about 0.2 micron, a length of from about 0.3 to about 1.5 microns and further characterized in that the ratio of length to cross-sectional diameter is from about 3 to about 15, and (c) separating said precipitated titanium values from the reaction mixture.

4. The process as defined in claim 3 wherein the admixture is heated at a temperature of from about 210° to about 260° C. for a period of from about 0.5 to about 5 hours to hydrolyze the titanium chloride present therein.

5. The process as defined in claim 3 and including the step of calcining the precipitated titanium values at a temperature of from about 700 to about 900° C. for a period of from about 0.5 to about 6 hours.

6. A process for preparing a pigment grade, acicular, rutile titanium dioxide product which comprises;

(a) heating at a temperature of from about 60 to about 90° C. for a period of from about 4 to about 60 minutes an aqueous titanium chloride solution having a chloride/titanium gram-mole ratio of from about 1.6 to about 2.3, a pH of from about 0.3 to about 0.7 and a titanium concentration of from about 8 to about 15 grams per liter thereby to prepare a turbid, bluish-colored, opalescent colloidal suspension of titanium dioxide particles, said particles having diameters ranging from about 0.002 to about 0.01 micron, (b) adding a quantity of said colloidal suspension to a titanium tetrachloride solution having a chloride/titanium ratio of at least 4, a hydrogen ion/titanium ratio of at least 4 and a Ti concentration of from about 15 to about 85 grams per liter such that said seed supplies a titanium concentration of from about 4 to about 10 weight percent of the titanium values in the resulting reaction mixture, (c) heating said reaction mixture at a minimum temperature of about 190° C. for a period of from about 0.5 to about 5 hours thereby to hydrolyze said titanium chloride and percipitate titanium oxide therein as a pigment grade, acicular, rutile titanium dioxide product having a cross-sectional diameter of from about 0.05 to about 0.2 micron, a length of from about 0.3 to about 1.5 microns and further characterized in that the ratio of length to cross-sectional diameter is from about 3 to about 15, and (d) separating said precipitated titanium oxide from said reaction mixture.

7. The process as defined in claim 6 and including the step of calcining said precipitated oxide at a temperature of from about 800 to about 850° C. for about 1 hour.

8. A process for preparing a pigment grade, acicular, rutile titanium dioxide product which comprises;

(a) admixing an aqueous turbid, bluish-colored, opalescent colloidal suspension of titanium dioxide nucleating seed particles with an acidic titanium chloride solution having a minimum chloride/titanium ratio of 4, a minimum hydrogen ion/titanium ratio of 4, and a titanium concentration of from about 15 to about 85 grams per liter, the seed particles in said colloidal suspension ranging in diameter from about 0.002 to about 0.01 micron, said colloidal suspension providing from about 4 to about 10 weight percent of the titanium values in the resulting admixture and said colloidal suspension being prepared by heating an aqueous titanium chloride solution having a chloride/titanium ratio of from about 1.5 to about 4, a pH of from about 0.3 to about 0.7 and titanium concentration of from about 8 to about 30 grams per liter, (b) heating said admixture to hydrolyze the titanium chloride present therein and precipitate the titanium values as acicular particles having a cross-sectional diameter of from about 0.05 to about 0.2 micron, a length of from about 0.3 to about 1.5 microns and further characterized in that the ratio of length to cross-sectional diameter is from about 3 to about 15, (c) separating said precipitated titanium values from the reaction mixture, and (d) calcining the precipitate at a temperature of from about 700 to about 900° C. for a period of from about 0.5 to about 6 hours thereby to prepare said acicular, rutile titanium dioxide product.

9. A process for preparing a pigment grade, acicular, rutile titanium dioxide product which comprises;

(a) heating at a temperature of from about 60 to about 90° C. for a period of from about 4 to about 60 minutes a substantially iron free aqueous titanium chloride solution having a chloride/titanium gram-mole ration of from about 1.6 to about 2.3, a pH of from about 0.3 to about 0.7 and a titanium concentration of from about 8 to about 30 grams per liter thereby to prepare a turbid, bluish-colored opalescent colloidal suspension of titanium dioxide particles, said particles ranging in diameter from about 0.002 to about 0.01 micron, (b) adding a quantity of said colloidal suspension to a titanium tetrachloride solution having a chloride/titanium ratio of at least 4, a hydrogen ion/titanium ratio of at least 4 and a Ti concentration of from about 15 to about 85 grams per liter such that said seed supplies a titanium concentration of from about 4 to about 10 weight percent of the titanium values in the resulting reaction mixture, (c) heating said reaction mixture at about 100° C. thereby to hydrolyze said titanium chloride and precipitate titanium oxide therein as titanium dioxide particles having a cross-sectional diameter of from about 0.05 to about 0.2 micron, a length of from about 0.3 to about 1.5 microns and further characterized in that the ratio of length to cross-sectional diameter is from about 3 to about 15, (d) separating said precipitated titanium oxide from said reaction mixture, and (e) calcining said precipitated oxide at a temperature of from about 800 to 850° C. for about 1 hour thereby to produce said acicular, rutile titanium dioxide.

10. A process for preparing a pigment grade, acicular, rutile titanium dioxide product which comprises;

(a) admixing an aqueous turbid, bluish-colored opalescent colloidal suspension of titanium dioxide nucleating seed particles with an acidic titanium chloride solution having a minimum chloride/titanium ratio of 4, a minimum hydrogen ion/titanium ratio of 4, and a titanium concentration of from about 15 to about 85 grams per liter, the titanium dioxide nucleating seed particles in said suspension having diameters ranging from about 0.002 to about 0.01 micron, said colloidal suspension providing from about 4 to about 10 weight percent of the titanium values in the resulting admixture and said colloidal suspension being prepared by heating an aqueous titanium chloride solution having a chloride/titanium ratio of from about 1.5 to about 4, a pH of from about 0.3 to about 0.7 and a titanium concentration of from about 8 to about 30 grams per liter, (b) heating said admixture at a minimum temperature of about 175° C. from about 1 to about 6 hours under autogenous pressure to hydroylze the titanium chloride present therein and precipitate the titanium values therein as a pigment grade, acicular, rutile titanium dioxide product having a cross-sectional diameter of from about 0.05 to about 0.2 micron, a length of from about 0.3 to about 1.5 microns and further characterized in that the ratio of length to cross-sectional diameter is from about 3 to about 15, and (c) separating said precipitated titanium dioxide from the reaction mixture.

11. The process as defined in claim 10 and including the step of calcining the precipitated titanium dioxide at a temperature of from 800 to about 850° C. for about 1 hour.

References Cited

UNITED STATES PATENTS

| | | | |
|---|---|---|---|
| 2,273,431 | 2/1942 | Booye | 23—202 |
| 2,406,465 | 8/1946 | Keats | 23—202 |
| 3,030,183 | 4/1962 | Berry | 23—202 |
| 3,104,950 | 9/1963 | Ellis | 23—202 |

OSCAR R. VERTIZ, *Primary Examiner.*

E. STERN, *Assistant Examiner.*